Aug. 27, 1968  E. L. EGBERT ET AL  3,398,532
HYDRODYNAMIC TORQUE TRANSMITTING UNIT WITH
VARIABLE PITCH BLADING
Filed March 22, 1967

INVENTORS
Earl L. Egbert,
Paul O. Stevenson, &
Wayne O. Sundberg

Charles R. White
ATTORNEY

United States Patent Office 3,398,532
Patented Aug. 27, 1968

3,398,532
HYDRODYNAMIC TORQUE TRANSMITTING UNIT
WITH VARIABLE PITCH BLADING
Earl L. Egbert, Northville, and Paul D. Stevenson,
Plymouth, Mich., and Wayne D. Sundberg, Albuquerque, N. Mex., assignors to General Motors
Corporation, Detroit, Mich., a corporation of
Delaware
Filed Mar. 22, 1967, Ser. No. 625,103
10 Claims. (Cl. 60—54)

ABSTRACT OF THE DISCLOSURE

A hydrodynamic torque converter having a control motor mechanism movably mounted in the stator hub which can be moved by control forces to a first set position to turn stator blades to a closed, high-angle position for reducing torque transmission through the converter, or to a second set position to turn the blades to a fully open, low-angle position for highly efficient torque transmission by the converter or to an intermediate position established by a yieldable stop mechanism in response to increased torque demand to turn the blades to an intermediate angle position for increased torque multiplication by the converter.

---

This invention relates to hydrodynamic torque transmitting units and more particularly to a torque converter having a multibladed member in which the angle of the blades is varied by movement of a control motor mechanism to change the torque transmitting characteristics of the torque converter.

The control motor mechanism for varying the blade angle in a preferred embodiment of this invention includes an expansible chamber motor mechanism in which a single piston is utilized to turn the blades through crank mechanisms to high angle, medium angle and low angle positions. In this embodiment the intermediate position is established upon contact of the piston with a preloaded yieldable member which can be compressed to provide for movement of the piston to establish a low-blade angle position.

This invention can be utilized with advantage in vehicle torque converter transmissions since the stator with its blades set at a high angle with respect to the center line of the converter will restrict fluid flow through the stator and reduce vehicle creep when the vehicle is idling. When the stator blades are positioned at an intermediate angle, increased vehicle performance is obtained since the torque converter is able to provide torque conversion at higher input power. When the blades are positioned at a low angle the torque converter can transmit and multiply engine torque with high efficiency.

It is an object of this invention to provide a hydrodynamic torque transmitting unit with a variable pitch bladed member in which the pitch of the blades is controlled by new and improved motor mechanism to high, low and intermediate angle positions to accordingly vary the torque transmitting characteristics of the unit.

Another object of this invention is to provide a hydrodynamic torque transmitting unit having a stator with variable pitch blades thereon with the blade angle being varied by operation of an expansible chamber motor and with an intermediate blade position established by motor contact with a yieldable stop mechanism.

Another object of this invention is to provide a hydrodynamic torque transmitting unit with variable pitch blades for varying unit torque transmitting characteristics in which the blades are all turned to a fixed, high angle in response to a force provided by converter pressure on an expansible chamber motor mechanism, or to a fixed, low-angle position in response to an opposing control force on the motor mechanism, or to an intermediate-angle position by converter fluid forces acting on the blades to bias the motor mechanism into engagement with an intermediate stop provided by a preloaded spring.

Another object of this invention is to provide a hydrodynamic torque converter for a vehicle transmission with the converter having variable pitch stator blades in which the blades are set at high angles by an improved motor mechanism to reduce vehicle creep at engine idle, at an intermediate angle established by the positioning of the motor mechanism against a yieldable stop mechanism for high vehicle performance and at a low angle by movement of the motor mechanism compressing the yieldable mechanism for vehicle cruising operations.

Other objects and advantages of the invention will be apparent from the following detailed description and drawings in which.

Figure 1:
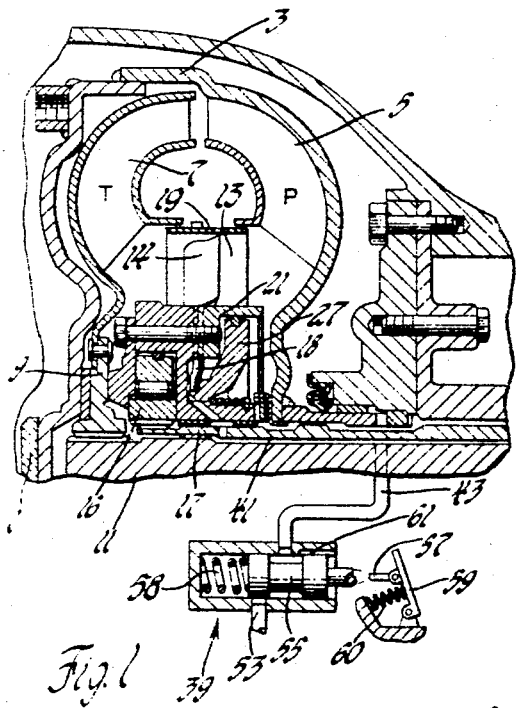
FIGURE 1 is a diagrammatic view of a torque converter transmission having a stator with variable pitch blading and having controls for varying the pitch of the stator blades.
Figure 2:
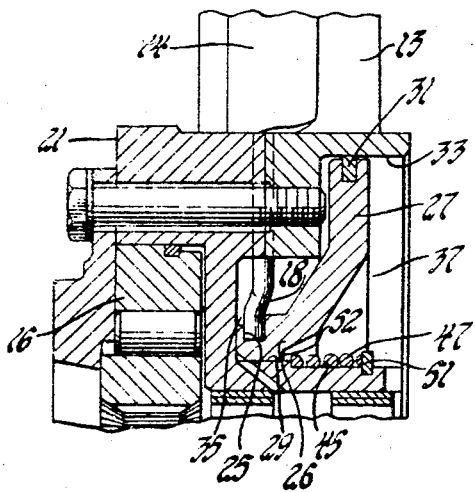
FIGURES 2, 3 and 4 are enlarged views of the stator construction of FIGURE 1 illustrating operation of the motor control mechanism for varying the pitch of the stator blades.

In FIGURE 1 the vehicle transmission input 1 drives the housing 3 of a hydrodynamic torque converter that carries the bladed torque converter pump 5. The pump circulates fluid in the converter torus chamber in housing 3 to the turbine 7 which is connected by hub 9 to the intermediate drive shaft 11. Fluid exiting from the turbine enters the bladed stator 13 and is directed back to the pump 5 by the blades 14 of the stator. The stator is mounted on a one-way brake 16 which is mounted on a ground sleeve 17. The torque converter with the stator held stationary by the one-way brake functions to multiply input torque and with the stator rotating functions as an efficient fluid coupling to transmit input torque without multiplication.

The stator blades are fixed on cranks 18 which are pivotally supported by a stator hub 21. These blades are movable between high, intermediate and low angles with respect to the center line of the torque converter. The crank is located in the blade so that the hydraulic force of liquid flowing past the blades tends to move the blades toward the position of lowest angle or open position. Each of the cranks has an offset portion which is seated in an annular groove 25 formed in a shoulder portion 26 of an annular piston 27.

The piston 27 is mounted for reciprocal longitudinal movement on a cylindrical wall 29 and in a cavity formed by the stator hub. This piston has an outer annular seal 31 in sealing contact with the cylindrical wall 33 of the stator hub. The piston separates the cavity in the hub into two pressure chambers 35 and 37. Chamber 37 is open at all times to converter pressure while chamber 35 is hydraulically connected with a port in a control valve 39 by a fluid conducting passage 41 and conduit 43. The inner cylindrical wall 29 of the stator hub has a reduced diameter portion 45 which accommodates the coil spring 47 and forms an annular shoulder 49. Spring 47 is preloaded between shoulder 49 and a snap ring 51. The end of this spring projects slightly above the shoulder for contact with an annular abutment face 52 formed on piston 27. The control valve 39 has an inlet port connected to a pressure inlet conduit 53 and has a slidable valve member 55 which is operatively connected by linkage 57 to a throttle control pedal 59 for a vehicle engine.

When the throttle pedal is released it is biased by a return spring 60 to the FIGURE 1 position and valve spring 58 shifts valve member 55 to that the inlet conduit 53 is blocked and the chamber 35 is exhausted through an exhaust 61 formed in one end of the valve. The converter charge pressure is then effective on the outer face of piston 27 to provide sufficient force moving the piston to the left into contact with the outer radial wall of the stator hub. This piston movement turns the cranks 18 which turn the stator blades to a high-angle, or closed position reducing converter torque transmission or the capacity of the torque converter to transmit torque and accordingly providing an anti-creep feature for vehicles.

Figure 3:
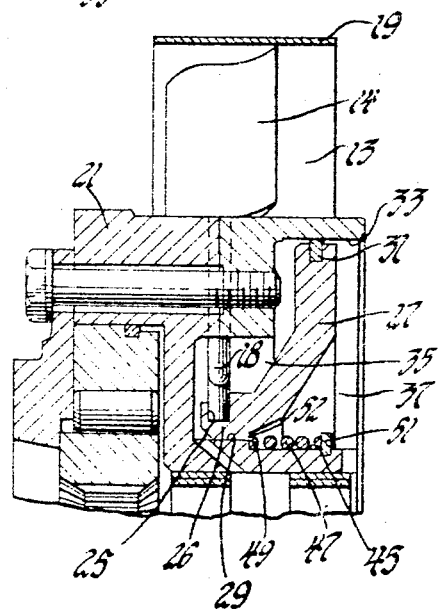

For performance the throttle control will be moved to its full throttle position and valve member 55 will be moved to the left so that conduit 43 leading to chamber 35 is blocked by the right land of the valve member 55. Converter charge fluid leaking past seal 31 and the wall 29 mounting the piston pressurizes chamber 35 with a pressure about equal to converter charge pressure. This pressure provides a force on the piston 27 which combines with the force provided by the stator blade crank force to move the piston 27 to the right until the piston shoulder engages the end of preloaded spring 47. However, the spring force stops further movement of the piston from this position, illustrated in FIGURE 3. The stator blades are thus positioned at an intermediate angle to reduce torque converter capacity to an intermediate value to momentarily reduce the load so the vehicle engine speed will increase for operation at a higher power level and the converter can function to multiply and transmit these higher torques to the intermediate shaft to provide for increased vehicle performance.

Figure 4:
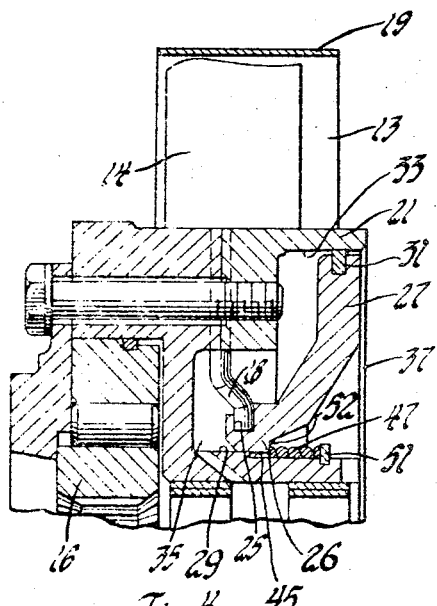

During normal operation of the vehicle engine at throttle positions between idle and a high or full throttle position the torque converter capacity is matched to the engine to provide optimum torque and power transmission and economy of operation by positioning the blades in the low angle position. In normal operation the lands of the valve element are blocking only exhaust 61 and a pressure higher than the torque converter chamber or charging pressure; such as, the main line pressure in transmission control systems, is admitted from conduit 53 to the chamber 35. The increased pressure in chamber 35 provides a force greater than the force of spring 47 and the force of the converter charge pressure on piston 27 and the piston 27 will move to the right to fully compress the spring as shown in FIGURE 4. Contact of the coils of the spring stops further movement of the piston to the right. In this piston position the cranks 18 are turned to turn the stator blades to their low angle, open blade position and the converter can function to efficiently transmit engine torques to the intermediate drive shaft for vehicle cruising.

While one embodiment of the invention has been disclosed for purposes of illustrating the invention, other embodiments and modifications may now be readily made. This invention is, therefore, not to be limited to the embodiment shown and described but by the claims which follow.

We claim:

1. A hydrodynamic torque converter for transmitting torque from an input to an output, said converter including a variable pitch bladed member having movable blades, movable motor means operatively coupled to said blades of said member for exerting a control force for varying the pitch of said blades between high, low and intermediate angle positions with respect to the center line of said converter, positioning means operatively connected to said movable means for exerting a retarding force thereon to stop movement of said movable means to establish one of said blade angle positions and yielding in response to said control force exerted thereon by said movable means greater than said retarding force of said positioning means to establish another of said blade angle positions.

2. The torque converter of claim 1, said positioning means being formed by a spring, said converter further including means for holding said spring in said converter in a preloaded condition.

3. In a hydrodynamic unit, a rotatable input and an output opertively connected to said unit, said unit including a member having a plurality of blades movable between limits providing an open blade position and a closed blade position, motor means operatively coupled to said blades for moving said blades between said positions, a yieldable member mounted in said unit for stopping movement of said motor means and said blades between said limits to establish a partially open blade position permitting said input to be rotated at a higher speed as compared to the speed of the input when said blades are at open position.

4. The unit defined in claim 3, said motor means being a piston and said yieldable means being a spring, means for holding said spring in said unit so that it contacts said piston only when said piston moves said blades to partially open and fully open positions.

5. In a torque transmitting unit circulating working fluid therein to transmit torque from input means to an output means, comprising in combination, a rotor operatively connected to said input means for pumping working fluid in said unit, a member having a plurality of fluid directing blades mounted thereon, means rotatably mounting said blades on said member for simultaneous movement of said blades between high, low and intermediate angular position with respect to the center line of said unit, movable motor means operatively connected to said last mentioned means to move said blades from any one of said positions to any other of said positions to change the torque transmitting characteristics of said unit, a yieldable mechanism for holding contact with said motor means without substantial yielding to establish said intermediate angle position of said blades and yielding in response to a predetermined force applied thereto by said motor means to move said blades to another of said angular positions.

6. In a hydrodynamic torque converter for transmitting torque from an input to an output, pump means operatively connected to the input and rotor means operatively connected to the output, a stator having a hub and a plurality of blades pivotally mounted on said hub, crank means operatively connected to said blades and mounting said blades on said hub, motor means movably mounted in said hub operatively connected to said crank means for pivoting said blades, said motor means and said hub providing a plurality of control chambers, torque demand control means, fluid conducting means, operatively connecting said torque demand control means and a first of said chambers, yieldable stop means positioned in a second of said chambers, said motor means responding to high torque demand signal from said control means to move into engagement with said yieldable means to turn said blades to a partially open position and responding to low torque demand signal from said control means to compress said yieldable means to allow said blades to move to a fully opened position and further responsive to zero torque demand signal from said control means to position said blades to a fully closed position.

7. The torque converter of claim 6 wherein said second of said control chambers is open to converter pressure, said control means being operative to open the first of said chambers to exhaust in response to low torque demand signal to allow converter pressure to effect movement of said motor means and thereby position said blades to a closed position.

8. The torque converter of claim 7 wherein said hub includes a plurality of restraining portions, said yieldable means being a coil spring preloaded between said restraining portions and having an end coil projecting above one of said restraining portions into the path of movement of said motor means for contact with said motor means.

9. In combination an input member and an output member, a torque converter having a plurality of rotors, one of said rotors being operatively connected to said input member, another of said rotors being operatively connected to said output member, a stator formed with an inner annular hub portion and having a plurality of variable pitch blades supported thereon, means pivotally mounting said blades to said hub portion, a piston mounted in said hub and cooperating with said hub portion to provide a plurality of control chambers, one of said chambers being constantly open to converter pressure, a torque demand control including a fluid pressure control valve, fluid conducting means operatively connecting said valve to the other of said chambers, a spring mounted in said hub for stopping said piston movement without substantial yielding in response to high torque demand signal from said control to position said blades at a partially open position and for stopping said piston movement subsequent to yielding in response to a reduced torque demand signal from said torque demand control.

10. In a hydrodynamic torque converter for transmitting torque from an input to an output, a plurality of rotors, a first of said rotors being operatively connected to said input and a second of said rotors operatively connected to said output, a stator having an inner annular hub portion and a plurality of variable pitch blades mounted thereon, crank means pivotally mounting said blades to said hub portion, an annular piston operatively connected to said crank means longitudinally movable in said hub portion for pivoting said blades when moving longitudinally, said piston cooperating with said hub to provide first and second control chambers, torque demand control means including fluid pressure control valve means operatively connected to said first chamber, said control valve means being movable to admit pressure to said first chamber in one position and to block said first chamber in another position and exhaust fluid therefrom in a third position, yieldable stop means located in the other of said chambers, said piston responding to high torque demand signal from said control valve to move into engagement with said yieldable means to position said blades to a partially open position and responding to low torque demand signal from said control valve means to compress said yieldable means to move said blades to a fully open position and further responsive to a zero torque demand signal from said control means to position said blades to a fully closed position, said movement of said blades between said positions being effective to vary the torque transmitting characteristics of said converter.

No references cited.

EDGAR W. GEOGHEGAN, *Primary Examiner.*